Feb. 18, 1941.  H. C. TIFFT  2,231,969
DENTAL TOOL
Filed April 23, 1937
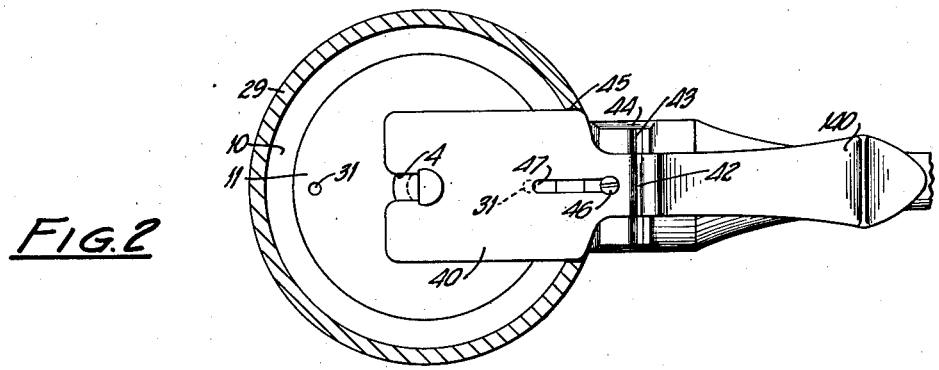
FIG.2
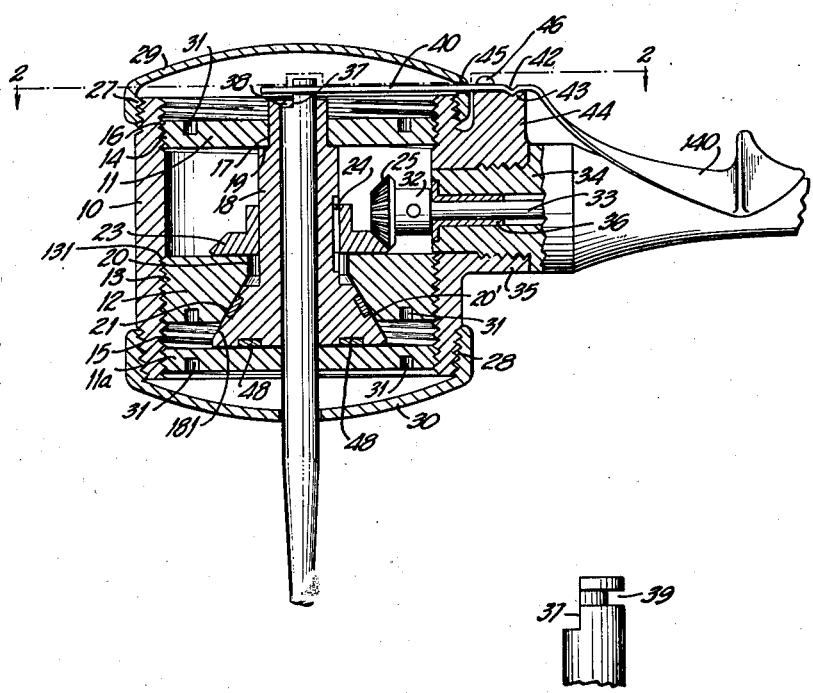
FIG.1
FIG.4
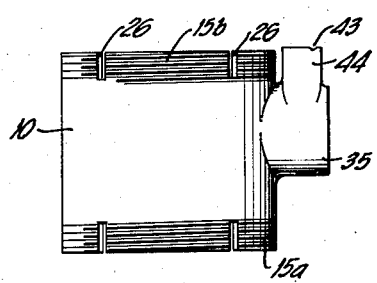
FIG.3
INVENTOR
HAROLD C. TIFFT
BY
ATTORNEY Patented Feb. 18, 1941

2,231,969

UNITED STATES PATENT OFFICE 2,231,969

DENTAL TOOL

Harold C. Tifft, Albany, N. Y.

Application April 23, 1937, Serial No. 138,554

6 Claims. (Cl. 32—27)

My invention relates to dental tools and particularly to improvements in angle hand pieces. Since devices of this character are inserted in the mouth of the patient, they are necessarily very small and, although the parts thereof are subjected to comparatively heavy stresses and move at high speed, it is quite impossible, principally because of the limitations in size, so to design them as to eliminate rapid wear in the bearings. Loose bearings not only cause a very annoying vibration, but the tool or burr does not rotate about its geometric axis, and it is very difficult for the operator to drill a tooth cavity, particularly where it is comparatively small.

One of the objects of my invention, therefore, is the provision of an angle hand piece in which the bearings for the tool-retaining chuck are so constructed and arranged that, by simple adjustments, wear in the bearings may be readily taken up and the tool thus maintained in the same, or substantially the same, fixed axial alignment.

Attempts have hitherto been made to overcome, or at least minimize, the foregoing difficulties, but it has been done at the expense of increased wear in and impaired efficiency of the driving connections in the hand piece. In other words, in adjusting the bearings to take up wear therein, the initially correct pitch relation of the driving and driven gears is changed so that they do not properly intermesh, and vibration, grinding and rapid wear takes place thereafter. In the device embodying my invention, the driving gear of the hand piece is maintained in proper mesh with the driven gear.

Another object of my invention is the provision of a device of the foregoing character which is simple in construction, cheap, and rugged, considering the fact that the device is comparatively small.

Other objects of my invention will appear in the specification and the novel features thereof will be particularly pointed out in the claims.

My invention will best be understood by reference to the accompanying drawing in which I have illustrated a preferred embodiment thereof and in which—

Fig. 1 is a vertical section at an enlarged scale of a device embodying my invention, and showing a portion of the hand piece in front elevation;

Fig. 2 is a section of Fig. 1 in the plane 2—2;

Fig. 3 is a front elevation of the casing of the device to a smaller scale than that shown in Figs. 1 and 2; and Fig. 4 is an enlarged view of the upper end of the shank of the tool.

Like reference characters indicate like parts throughout the drawing.

Referring to the drawing, 10 is a casing, preferably generally cylindrical in form. Two bearing elements or discs 11 and 12 are removably secured in the casing, the discs preferably being threaded as at 13 and 14 and engaging interior screw threads 15 and 16, respectively, at the ends of the casing. The disc 11 is provided with an axial opening 17 in which the upper contracted end of the burr or tool-retaining chuck 18 is received, the end of the chuck thus being provided with a shoulder 19 which engages the disc 11. The second disc 12 is likewise provided with an opening 20 which extends axially of the casing and which comprises a conical portion 20' defining a conical bearing surface 21. The chuck is provided with a conical bearing portion 181 the bearing surface of which engages the conical bearing surface in the disc 12.

A bevel gear 23 surrounds the chuck and one side thereof is seated against the upper surface, as viewed in Fig. 1, of the disc 12, and is splined to the chuck as at 24 so that the bevel gear rotates the chuck but relative axial movement between the chuck and the gear is permitted.

In the embodiment of my invention illustrated, the interior of the casing is provided at the upper limit of the lower interior screw threads 13 with a fixed abutment 131 which limits the upward movement of the disc 12 so that when the disc is screwed into the case as far as possible gear 23 resting on the top of disc 12 is properly meshed with gear 25.

In accordance with my invention, means are also provided for maintaining the disc 11 and the disc 11a which is mounted within the lower end of the casing in adjusted position within the casing. In the embodiment of my invention illustrated, these discs are maintained in such adjusted position by splitting the ends of the casing as at 26 (Fig. 3) and forming the outer threads at the ends of the casing as pipe threads; in other words, the threads 15a and 15b at the ends of the casing are tapered slightly from the ends of the casing so that when the interior threads 27 and 28 of the end caps 29 and 30 for the casing engage the pipe threads at the ends thereof, such ends are sufficiently contracted to cause the ends of the casing to grip the discs 11 and 11a tightly and prevent their turning in the casing. The upper surface of the disc 11a engages the lower face of the conical bearing portion 181 of the chuck and by suitably adjusting the same vertically, the bearing surface thereof may be brought into proper bearing relation with the conical bearing surface of the disc 12. The discs 11, 12 and 11a are provided with recesses 31 which may be engaged by a spanner wrench for turning the respective discs. Such recesses are preferably all so located that a single spanner wrench will serve all of the discs.

It will, of course, be understood that the discs 11, 12 and 11a are threaded into the casing in such a direction that the engaging rotating parts will tend to rotate the discs inwardly. For example, the threads on the disc 11 and the associated screw threads on the interior of the casing are in such a direction, that any rotation of the disc 11 which is caused by the rotation of the chuck 18 will be inwardly against the shoulder 19. By splitting the ends of the casing and securing the discs in position in the described manner, I avoid the use of set screws which would of necessity be very small, difficult to manipulate and easily lost.

The bevel gear and the chuck in which it is mounted are driven by a pinion 25 provided with a hub 32 secured to the drive shaft 33. The shaft 33 runs in a bearing member 34 secured, as by screw threads, in an angle sleeve 35, and preferably having a bushing 36 interposed between the shaft and the bearing member.

The tool or burr is of standard construction and is caused to rotate with the chuck in which it is mounted by flattening the upper end of the shank, as indicated at 37 in Fig. 1, and providing an opening in the upper end of the chuck which conforms in contour to the end of the shank. This is accomplished by providing a lip 38 which overlies the cut-away portion of the upper end of the chuck, thereby leaving an opening in the top of the chuck having substantially the same size and contour as the flattened upper end of the shank so that the rotation of the chuck causes the rotation of the tool.

The burr or tool is held in position in the usual manner by providing the upper end of the shank with a groove 39 (Fig. 4) in which is received the forward end of a retaining plate 40. Plate 40 is provided with a notch 4 which engages the groove 39 in the upper end of the shank on the forward movement of the plate. The plate 40 is also provided with a struck down portion 42 which engages a recess 43 formed in the upper side of a lug or bracket 44 formed on the casing. The plate 40 passes through an opening 45 formed in the flange 27 of the cap 29 and is guided in its movements by a set screw 46 passing through a slot 47 in the plate and engaging the bracket 44. The rear end of the plate is formed into a handle 140 which is preferably curvilinear in cross section and embraces and is centered by the forward end of the casing of the hand piece. It will, of course, be understood that in order to remove the disc 11 from the casing, it would first be necessary to withdraw the tool-retaining plate 40 from the casing.

The conical bearing portion 181 is preferably provided with inserts 48 and 21 of suitable bearing material and engageable, respectively, with the upper surface of the disc 11a and the conical bearing surface of the disc 12.

It will be seen that there can be no wear between the shank of the burr and the chuck in which it is mounted. At the same time by mounting the bevel gear which rotates the chuck upon a disc or element which may be fixed in position with reference to the casing, the gear may be maintained in proper meshing relation to the drive gear and the power may thus be most effectively transmitted from the engine to the chuck in the angle head.

While I have described my invention in its preferred embodiments, it is to be understood that the words which I have used are words of description rather than of limitation. Hence, changes within the purview of the appended claims may be made without departing from the true scope and spirit of my invention in its broader aspects.

What I claim is:

1. In a device of the character described, the combination with a casing, of a rotatable chuck mounted therein and adapted to retain a tool, a first gear surrounding said chuck and driving the same, a spline connection between said chuck and gear providing free relative axial movement of said chuck and gear, a supporting element mounted within said casing on which said first gear is supported, a second gear engageable with said first gear and operable from without said casing; said supporting element and said chuck being provided with coacting conical bearing surfaces; and adjustable means for effecting relative axial movement of said coacting bearing surfaces whereby wear therein may be taken up.

2. In a device of the character described, a cylindrical casing, bearing discs mounted therein and provided with openings axially thereof, the opening in one of said discs comprising a conical portion defining a conical bearing surface, a chuck for retaining a tool and having its bearings in the openings of said discs and provided with a conical bearing member the bearing surface of which is engageable with said conical bearing surface of the associated disc, movable means engageable with said chuck for moving the same axially and bringing the conical bearing surface of said conical member into engagement with said conical bearing surface of the associated disc, a first bevel gear surrounding said chuck, a spline connection between said gear and chuck, a driving shaft extending into said casing, and a second bevel gear mounted on said shaft and meshing with said first bevel gear.

3. In a device of the character described, a cylindrical casing, two bearing discs mounted therein and provided with openings substantially axial of said casing, means whereby said discs may be adjusted axially of said casing, the opening in one of said discs comprising a conical portion defining a conical bearing surface, a chuck for supporting a tool and having its bearings in the openings of said discs and provided with a conical bearing member the bearing surface of which is engageable with the conical bearing surface of the associated bearing disc, a first bevel gear surrounding said chuck and rotatable therewith, a spline connection between said gear and chuck, a third disc mounted in said casing opposite the free end of said chuck, means whereby said third disc may be adjusted axially of said casing to engage said chuck and bring the conical bearing surface thereof into engagement with the conical bearing surface of the associated disc, a driving shaft extending into said casing, and a second bevel gear mounted on said shaft and engageable with said first bevel gear.

4. In an angle hand piece of the character described, a casing, a tool supporting chuck rotatably mounted therein and provided with a conical bearing surface, bearings for said chuck one of which is conical in form and in which the conical chuck bearing is received, a driven bevel gear surrounding said chuck for driving the same, a spline connection between said chuck and gear for providing free relative axial movement of said chuck and gear, a driving bevel gear meshing with said driven bevel gear, and adjustable means for moving said chuck axially to compensate for wear in said conical bearing.

5. In an angle hand piece, the combination with a casing, spaced bearing elements mounted in said casing and provided with aligned openings one of which is conical in form and defines a conical bearing surface in the associated bearing element, a chuck passing through said openings and provided with a conical portion the conical surface of which engages said conical bearing surface, a driven bevel gear surrounding said chuck and a surface of which rests on one of said bearing elements, a spline connection between said chuck and gear, a third bearing element mounted in said casing on which said chuck is supported, and means whereby said third bearing element may be moved along the casing thereby forcing the conical bearing surface of said chuck into engagement with the conical bearing surface of the associated bearing element.

6. A device of the character described comprising a casing, spaced bearings in said casing, a tool-supporting chuck rotatably mounted in said bearings, a driving gear, a driven gear, a spline connection between said chuck and said driven gear providing free relative axial movement of said chuck and driven gear, means securing said driven gear in fixed meshed relation with said driving gear, and bearing adjusting means for moving said chuck relative to said bearing elements and said driven gear.

HAROLD C. TIFFT.